Figures 1, 2:
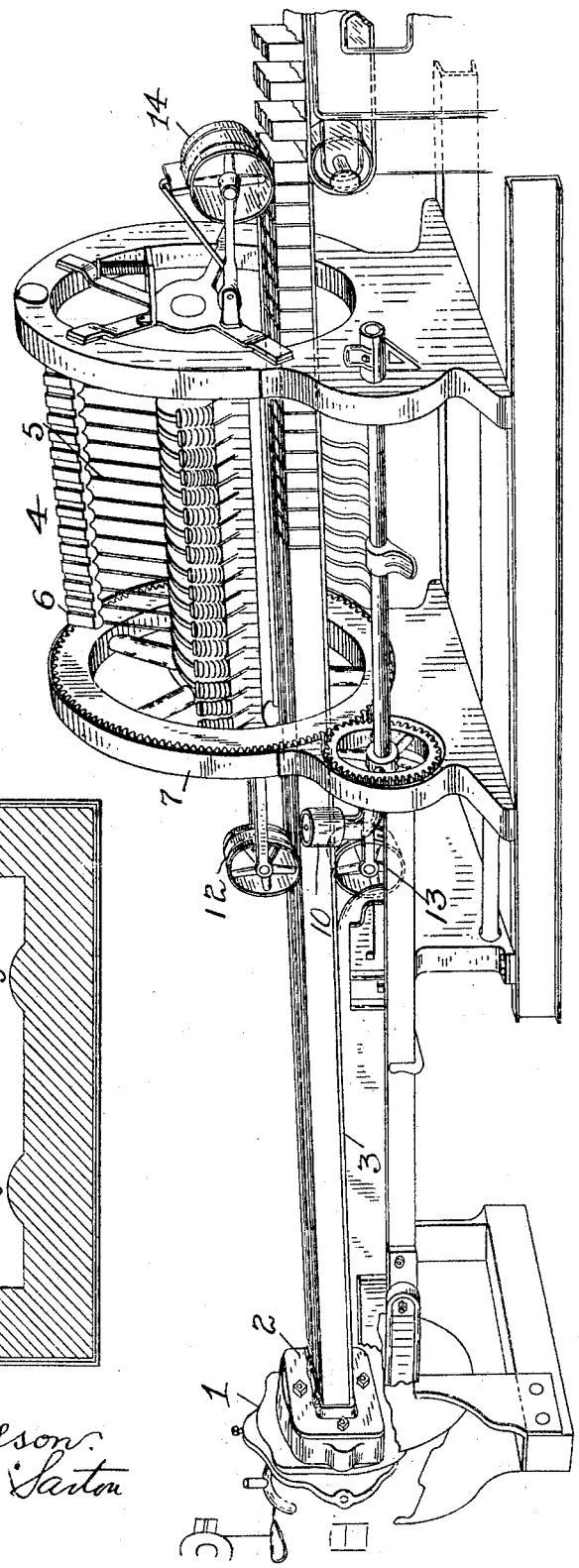

APPARATUS FOR MAKING BRICKS.
APPLICATION FILED AUG. 5, 1909.

959,006. Patented May 24, 1910.

Attest:
Ewd L. Tolson.
Edward N. Saxton

Inventor
William Hapley
by Spear, Middleton, Donaldson & Spear
Attys.

UNITED STATES PATENT OFFICE.

WILLIAM HANLEY, OF BRADFORD, PENNSYLVANIA.

APPARATUS FOR MAKING BRICKS.

959,006. Specification of Letters Patent. Patented May 24, 1910.

Application filed August 5, 1909. Serial No. 511,343.

*To all whom it may concern:*

Be it known that I, WILLIAM HANLEY, citizen of the United States, residing at Bradford, Pennsylvania, have invented certain new and useful Improvements in Apparatus for Making Bricks, of which the following is a specification.

My invention relates to the manufacture of brick for paving or other purposes, of that form in which projections or ribs are provided on one face of the brick and grooves on the reverse face, and it consists in the features and combination and arrangement of parts hereinafter described and particularly pointed out in the appended claims.

In the accompanying drawings, Figure 1 is a perspective view of an apparatus embodying my invention; and Fig. 2 is a face view of the mold.

In these drawings, 1 indicates the pug mill at the end of which the die or mold 2 is located. The material of which the bricks are formed is forced through the opening in this die or mold onto a table or way 3, and the column of material passing along this table is delivered to the cutting machine 4, where the material is acted upon by a series of wires or cutters 5 carried by a rotatable frame or carrier 6 supported in the standards 7. In order to form the ribs and grooves in the brick, I employ a die or mold of special form, as shown in Fig. 2, having at the points 8 recesses, and at the point 9 projections, so that, as the material is forced through the die or mold, the projections 9 will form grooves in the under side of the column of material, while the recesses 8 in the die or mold will form ribs on the upper side of the said column of material. This ribbed and grooved column of material being now delivered to the cutting apparatus, will be acted upon by the cutting wires or cutters, and severed into the proper form of bricks, each of which will, of course, have the ribs and the grooves formed therein.

In order to properly guide the strip of material after it leaves the die or mold, and as it is about to be delivered to the cutting section of the machine, I provide a roller at 10 to bear upon the lateral face of the column of material to hold this in place, and to guide it accurately into the cutting apparatus. I also provide an upper roller 12 adjacent the roller first mentioned, which is formed with circumferential grooves of a configuration the same as that of the ribs upon the upper surface of the column of brick material, and on the under side of the pathway of the said brick material I locate a third roller 13, which is provided with ribs on its periphery extending circumferentially about the same, and adapted, in shape and position, to enter the grooves in the column of material, and by the use of these three rollers, the strip of material to be cut will be fed accurately to the cutting section of the machine. Furthermore, after the bricks have been severed from the column or bar of material, they pass beneath a roller 14, which is provided with grooves extending circumferentially thereof, and adapted to fit the ribs on the brick and to deliver the brick to the conveyer without changing the shape of the ribs.

It will be observed that the ribs and grooves are of special form in relation to each other, the base of the grooves being somewhat wider than the base of the ribs, while the ribs are somewhat taller than the depth of the grooves. By this relative proportioning of the grooves and ribs, a space will be left for the introduction of grouting when the bricks are assembled in proper relation to each other, and by the proportions shown allowance is made for shrinkage without interfering with the proper performance of the functions of the parts.

Having thus described my invention what I claim is:—

1. In combination a die having upper recesses and lower projections to form upper ribs and lower grooves in the strip of material forced therethrough, cutting means, a grooved roller to bear on the upper face of the material in advance of the cutting means, a ribbed roller to bear on the grooved underside of the material in advance of the cutting means, and a grooved roller to bear on the upper side of the material in rear of the cutting means, substantially as described.

2. In combination a die having upper recesses and lower projections to form upper ribs and lower grooves in the strip of material forced therethrough, cutting means, a grooved roller to bear on the upper face of the material in advance of the cutting means, a ribbed roller to bear on the grooved underside of the material in advance of the cutting means, a grooved roller to bear on the upper side of the material in rear of the cut- Stadler, 299591, June 3, 84 " "

ting means, and a roller to bear on the side face of the material, substantially as described.

3. In combination a die through which the material is forced having projections and recesses, cutting means, a guide to bear on the lateral face of the material in advance of the cutting means, and a grooved roller to bear on the upper face of the material with its grooves engaging the ribs thereof, substantially as described.

In testimony whereof, I affix my signature in presence of two witnesses.

WILLIAM HANLEY.

Witnesses:
 EDWIN E. TAIT,
 KATHARINE BURKE.

Pfaunkucke, 345539, July 13, 86 (25-110)
ld in, above.
Ockershausen, 160945, Mar. 16, 75    " "